US009446562B2

(12) United States Patent
Sharygin et al.

(10) Patent No.: US 9,446,562 B2
(45) Date of Patent: Sep. 20, 2016

(54) COATED FILM FOR INSERT MOLD DECORATION, METHODS FOR USING THE SAME, AND ARTICLES MADE THEREBY

(71) Applicant: SABIC GLOBAL TECHNOLOGIES B.V., Bergen op Zoom (NL)

(72) Inventors: Andrei Sharygin, Mount Vernon, IN (US); Michael Matthew Laurin, Pittsfield, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 383 days.

(21) Appl. No.: 13/921,482

(22) Filed: Jun. 19, 2013

(65) Prior Publication Data

US 2013/0344299 A1 Dec. 26, 2013

Related U.S. Application Data

(63) Continuation-in-part of application No. 13/530,798, filed on Jun. 22, 2012.

(51) Int. Cl.
*B32B 3/10* (2006.01)
*B32B 27/36* (2006.01)
*C08J 7/18* (2006.01)
*C08J 7/04* (2006.01)
*B32B 27/08* (2006.01)
*B32B 1/00* (2006.01)
*B29C 45/14* (2006.01)
*C09D 4/00* (2006.01)

(52) U.S. Cl.
CPC ............ *B32B 3/10* (2013.01); *B29C 45/14811* (2013.01); *B32B 1/00* (2013.01); *B32B 27/08* (2013.01); *B32B 27/365* (2013.01); *C08J 7/042* (2013.01); *C08J 7/18* (2013.01); *B29C 45/1418* (2013.01); *B32B 2250/02* (2013.01); *B32B 2255/10* (2013.01); *B32B 2255/26* (2013.01); *B32B 2451/00* (2013.01); *C08J 2369/00* (2013.01); *C08J 2463/10* (2013.01); *C08J 2475/16* (2013.01); *C09D 4/00* (2013.01); *Y10T 428/24802* (2015.01); *Y10T 428/31507* (2015.04)

(58) Field of Classification Search
CPC .................................................. B32B 2255/26
See application file for complete search history.

(56) References Cited

U.S. PATENT DOCUMENTS

| | | |
|---|---|---|
| 4,373,061 A | 2/1983 | Ching |
| 4,481,093 A | 11/1984 | Murphy et al. |
| 4,929,506 A | 5/1990 | Kerr, III et al. |
| 5,271,968 A | 12/1993 | Coyle et al. |
| 5,391,795 A | 2/1995 | Pickett |
| 5,503,935 A | 4/1996 | Patel |
| 5,506,051 A | 4/1996 | Levy-Borochov et al. |
| 5,679,820 A | 10/1997 | Pickett et al. |
| 5,977,200 A | 11/1999 | Lake |
| 6,001,953 A | 12/1999 | Davis et al. |
| 6,117,384 A | 9/2000 | Laurin et al. |
| 6,350,521 B1 | 2/2002 | Chen et al. |
| 6,458,913 B1 | 10/2002 | Honigfort et al. |
| 6,537,636 B1 | 3/2003 | Wisnudel et al. |
| 6,624,223 B1* | 9/2003 | Thames et al. ............... 524/398 |
| 6,682,805 B1 | 1/2004 | Lilly |
| 6,773,649 B2 | 8/2004 | Bourne et al. |
| 6,863,981 B2 | 3/2005 | McBain |
| 7,037,952 B2 | 5/2006 | Itoh et al. |
| 8,053,065 B2 | 11/2011 | Ortmeier et al. |
| 2001/0008691 A1 | 7/2001 | Isogai et al. |
| 2002/0161154 A1 | 10/2002 | Cattron et al. |
| 2004/0152799 A1 | 8/2004 | Miller et al. |
| 2006/0154082 A1 | 7/2006 | Miller et al. |
| 2006/0286383 A1 | 12/2006 | Gilmer |
| 2007/0009741 A1 | 1/2007 | Boven et al. |
| 2007/0138667 A1 | 6/2007 | Dang et al. |
| 2008/0038549 A1 | 2/2008 | Griswold et al. |
| 2008/0254299 A1 | 10/2008 | Blackburn et al. |
| 2010/0003523 A1 | 1/2010 | Sharygin et al. |
| 2011/0183120 A1 | 7/2011 | Sharygin et al. |

(Continued)

FOREIGN PATENT DOCUMENTS

DE 19917965 A1 10/2000
WO 03093329 A1 11/2003

(Continued)

OTHER PUBLICATIONS

Cytec Industries, Inc., "EBECRYL® Resins for Field Applied UV Curable Concrete Topcoats." EBECRYL FAC Concrete Resins FPS. Nov. 19, 2010. pp. 1-7.
Delombard-Watts, M.; "Performance Benefits of Incorporating a New Aliphatic Urethane Teraacrylate in UV Coatings"; Surface Specialties, Inc.; Oct. 1, 2004; http://www.pcimag.com/CDA/Archives/2151ad9d0d6a701VgnVCM100000f932a8c0__; 14 Pages.
Japanese Patent No. 2004010698 (A); Publication Date: Jan. 15, 2004; Abstract Only; XP-002547378; 2 Pages.
Japanese Patent No. 2004010698 (A); Publication Date: Jan. 15, 2004; Machine Translation Obtained from the Japanese Patent Office; 13 Pages.

(Continued)

Primary Examiner — Ian Rummel
(74) Attorney, Agent, or Firm — Cantor Colburn LLP

(57) ABSTRACT

In an embodiment, a coated thermoplastic film, comprises a polymeric film substrate; and a coating formed from a coating composition comprising a urethane acrylate having a functionality of 2.0 to 6.0 acrylate functional groups; an acrylate monomer having a functional group; and an epoxy acrylate oligomer; and an additive comprising at least one of a silicone based additive, palmitic acid, and combinations comprising at least one of the foregoing. In an embodiment, a method of molding an article comprises decorating and forming the coated thermoplastic film to form a shaped film, and placing the shaped film into a mold, and injecting a resin into the mold cavity space behind the shaped film, wherein the shaped film and the injection molded resin form a single molded part.

16 Claims, No Drawings

(56) References Cited

U.S. PATENT DOCUMENTS

2013/0344296 A1   12/2013   Sharygin et al.
2014/0220315 A1   8/2014   Zhang et al.

FOREIGN PATENT DOCUMENTS

WO   2007077584 A1   7/2007
WO   2007143343 A1   12/2007
WO   2010003071 A1   1/2010

OTHER PUBLICATIONS

Japanese Patent No. 2005132999 (A); Publication Date: May 26, 2005; Abstract Only; XP-002547377; 3 Pages.

Japanese Patent No. 2005132999 (A); Publication Date: May 26, 2005; Machine Translation Obtained from the Japanese Patent Office; 22 Pages.

Japanese Patent No. 2007291380 (A); Publication Date: Nov. 8, 2007; Abstract Only; XP-002547376; 1 Page.

Japanese Patent No. 2007291380 (A); Publication Date: Nov. 8, 2007; Machine Translation Obtained from the Japanese Patent Office; 21 Pages.

International Search Report; International Application No. PCT/US2009/049538; International Filing Date: Jul. 2, 2009; Date of Mailing: Oct. 7, 2009; 7 Pages.

Written Opinion of the International Searching Authority; International Application No. PCT/US2009/049538; International Filing Date: Jul. 2, 2009; Date of Mailing: Oct. 7, 2009; 7 Pages.

German Patent No. 19917965 (A1); Publication Date: Oct. 26, 2000; Abstract Only; 2 Pages.

Chattopadhyay et al.; "Thermal and Mechanical Properties of Epoxy Acrylate/methacrylates UV Cured Coatings"; Progress in Organic Coatings; vol. 54; 2005; pp. 10-19.

Industrial Coatings RADCURE® Energy Curable Resins, Publication No. 210115E, Version D, Retrieved Jan. 2011, www.cytec.com, 32 pages.

International Search Report; International Application No. PCT/US2013/046512; International Filing Date: Jun. 19, 2013 Date of Mailing: Sep. 13, 2013; 6 Pages.

Written Opinion of the International Searching Authority; International Application No. PCT/US2013/046512; International Filing Date: Jun. 19, 2013; Date of Mailing: Sep. 13, 2013; 7 Pages.

Goodrich; "The Effect of Oligomer Chemistry in UV/EB Laminating Inks"; 2008; as retrieved from http://www.inkworldmagazine.com/issues/2008-06/view_features/the-effect-of-oligomer-chemistry-in-uveb-lami/.

\* cited by examiner

COATED FILM FOR INSERT MOLD DECORATION, METHODS FOR USING THE SAME, AND ARTICLES MADE THEREBY

CROSS-REFERENCE TO RELATED APPLICATION

This application is a continuation-in-part application of U.S. application Ser. No. 13/530,798, filed on Jun. 22, 2012, the contents of which are incorporated herein in their entirety.

TECHNICAL FIELD

This disclosure relates to a coated film comprising a UV-cured composition that can be used for in-mold decoration.

BACKGROUND

Decorating a three-dimensional article via in-mold decoration (IMD) or insert mold decoration involves inserting a decorative film into a molding tool in combination with a molten base polymer during an injection molding cycle. The decorative film is then bonded with or encapsulated by the molten base polymer, after the injection molding cycle is complete, to obtain an injection molded article or finished part having the desired decoration. The decoration for the finished part can either be exposed to the environment as "first surface decoration" and/or encapsulated between the substrate of the decorative film and the injected material as "second surface decoration." Thus, the decorative film becomes a permanent fixture of the finished part. The film can act as an aesthetic effect carrier and/or as a protective layer for the base polymer, the ink, or both. The term "decorative" or "decoration" herein refers to surface printing or marking of an aesthetic, functional and/or informational nature that is printed on the decorative film including, for example, symbols, logos, designs, colored regions, and/or alphanumeric characters.

The decorative film can be printed with ink, specifically formable and high temperature inks. The film can then be formed on a tool into a three-dimensional shape that corresponds to the three-dimensional shape desired for the injection molded article.

Such processes are disclosed in U.S. Pat. No. 6,117,384 to Laurin et al., which describes a process wherein a colored decorated film is incorporated with a molten resin injected behind the film to produce a permanently bonded three-dimensional piece. U.S. Pat. No. 6,458,913 to Honigfort and U.S. Pat. No. 6,682,805 to Lilly also describe insert mold decorative films and articles. Lilly describes a multi-layer thermoplastic printable film comprising a thermoplastic film substrate having laminated to one surface a fluoride polymer in order to improve the birefringence and other properties of the film, including chemical resistance.

Increasingly it is desired that the exposed surface of a decorative film be resistant to scratch, abrasion, and chemical attacks. A cost-effective method to improve the surface characteristics of the film is to coat the film with a coating that provides the desired performance properties. For example, SABIC Innovative Plastic's LEXAN™ HP92S polycarbonate is coated with a proprietary hard coat specifically to improve surface durability against scratch and abrasion. The hard coat forms a bonded layer on the surface of the film, typically from 3 to 18 micrometers. The coating layer, however, is more brittle than desirable and, therefore, can limit the ability of the hard-coated film to be shaped or embossed.

In one approach, a coated polycarbonate film is only partially cured during the initial phase of the film production. Partially curing the film allows the hard coat to remain soft and compliant during thermoforming to shape the film. After the film had been thermoformed and put through an IMD process, the resulting article is then exposed to ultraviolet (UV) light for post-curing to achieve the desired surface hardness. This approach has a number of drawbacks. The partially cured film can only be exposed to special lighting. Normal lighting has a UV component that can cause a premature curing of the partially cured film. The soft surface of the partially cured film is prone to damage while it is being processed through the printing, thermoforming, and in-mold decoration injection steps, leading to a high level of yield loss. It is desirable to have a film with a hard coat already cured so that the coated film is robust to handling and does not need special lighting requirements.

In an alternative approach, an IMD three-dimensional article could also be subjected to post-production coating and subsequent curing. However, this added step in the manufacturing process can be expensive, time consuming and not provide a level of coating control, uniformity, and quality comparable to that of a pre-coated film. Post-production coating and subsequent curing can also need to be specific for a particular article, and some articles, due to their size or geometry, can need special handling requirements. A pre-coated film would eliminate these drawbacks or problems.

BRIEF SUMMARY

Disclosed herein, in various embodiments are coated thermoplastic films.

In an embodiment, a coated thermoplastic film comprises a polymeric film substrate; and a coating formed from a coating composition comprising a urethane acrylate having a functionality of 2.0 to 6.0 acrylate functional groups; an acrylate monomer having a functional group; an epoxy acrylate oligomer; and an additive comprising at least one of a silicone based additive, palmitic acid, and combinations comprising at least one of the foregoing.

In an embodiment, a coated thermoplastic film comprises: a polycarbonate film substrate; and a coating formed from a coating composition that comprises a urethane acrylate having a functionality of 2.0 to 3.0 acrylate functional groups, wherein the urethane acrylate has an elongation percent at break of at least 10 according to ASTM D882-10; an acrylate monomer having at least two acrylate functional groups; and an epoxy acrylate oligomer having an acrylate functional group; wherein the urethane acrylate is present in the amount of 30 to 70 wt. % of the coating composition, the acrylate monomer is present in the amount of 20 to 40 wt. % of the coating composition and the epoxy acrylate oligomer is present in the amount of 10 to 30 wt. % of the coating composition, a photoinitiator is present in the amount of 0.1 to 10 wt. % of the coating composition, and a silicone additive is present in the amount of 0.1 to 3 wt. %; wherein the coating composition has been cured; and wherein the film substrate is a co-extruded multilayer film substrate comprising a first layer, on which the coating is applied, comprising a blend of a first polycarbonate that comprises repeat units of dimethyl bisphenol cyclohexane monomer and a second polycarbonate that comprises repeat units of bisphenol A; and a second layer, adjacent to the first layer, comprising a polycarbonate that comprises repeat units of bisphenol A, without a polycarbonate that comprises repeat units of dimethyl bisphenol cyclohexane monomer.

In an embodiment, a method of molding an article comprises: decorating and shaping a coated thermoplastic film comprising a polymeric film substrate; and a coating formed from a coating composition comprising a urethane acrylate having a functionality of 2.0 to 6.0 acrylate functional groups; an acrylate monomer having a functional group; and an epoxy acrylate oligomer having an acrylate functional group; and placing the film into a mold, and injecting a resin into the mold cavity space behind the film, wherein said film and said injection molded resin form a single molded part.

DETAILED DESCRIPTION

Disclosed herein, in various embodiments, are coated thermoplastic films and methods of making articles comprising coated thermoplastic films. As indicated above, a coated thermoplastic film is disclosed comprising a polymeric (e.g., polycarbonate) film substrate having a coating that can be applied to one side of the polymeric film, where the coating composition can comprise a urethane acrylate having a functionality of 2.0 to 6.0 acrylate functional groups, an acrylate monomer having a functional group; and an epoxy acrylate oligomer. The epoxy acrylate oligomer can have a functionality of 1 to 6 acrylate groups, specifically, 1 to 5 acrylate groups, and more specifically 1 to 3 acrylate groups. The epoxy acrylate oligomer can also have a viscosity of less than or equal to 500 centipoise at 25° C. The epoxy acrylate oligomer can improve formability and the ability to stretch or thin of a coated thermoplastic film comprising the coating composition described herein without sacrificing abrasion resistance or impact resistance. The urethane acrylate oligomer can contain, on average, 2 to 5.5 acrylate functional groups, specifically, 2 to 3.5 acrylate functional groups, more specifically 2 to 3 acrylate functional groups. The urethane acrylate oligomer can have a viscosity of less than or equal to 50,000 centipoise at 25° C.

The coating composition can further comprise an acrylate monomer (i.e., meth(acrylate) monomer) containing an acrylate functional group, specifically 1 to 5, and more specifically 1 to 2. The acrylate monomer can have a viscosity of less than or equal to 50 centipoise at 25° C.

The coating composition can, optionally, further comprise a polymerization initiator to promote polymerization of the acrylate components. Suitable polymerization initiators can include photoinitiators that promote polymerization of the components upon exposure to ultraviolet radiation.

The coating composition can, optionally, further comprise a silicone additive (e.g., a silicone release additive). For example, the silicone release additive can comprise a siloxane polymer, including but not limited to, a polydimethysiloxane acrylate copolymer (e.g., a difunctional acrylate copolymer), a polyether polydimethysiloxane (e.g., a polyether modified acryl functional polydimethylsiloxane), polyalkyleneoxide modified polydimethylsiloxane copolymer, palmitic acid, and combinations comprising at least one of the foregoing.

The urethane acrylate in the coated thermoplastic film can have an elongation percent at break of greater than or equal to 10% according to ASTM D882-10, specifically an elongation percent at break of 15% to 100%, more specifically, an elongation percent at break of greater than or equal to 25%, still more specifically, greater than or equal to 40%, and even more specifically, greater than or equal to 45%. Furthermore, the urethane acrylate can have a tensile strength of 1,000 psi (6.9 MPa) to 5,000 psi (34 MPa) and a glass transition temperature of less than or equal to 50° C., specifically, less than or equal to 35° C., more specifically, less than or equal to 25° C., and even more specifically, less than or equal to 10° C.

The coating composition applied to the film substrate can comprise a urethane acrylate oligomer in the amount of 30 to 70 weight percent (wt. %), specifically 40 to 60 wt. %, more specifically 45 to 55 wt. %; acrylate monomer present in the amount of 20 to 40 wt. %, specifically 25 to 35 wt. %, more specifically 30 to 35 wt. %; epoxy acrylate oligomer present in the amount of 10 to 40 wt. %, specifically, 15 to 25 wt. %, more specifically, 15 to 20 wt. %; optional silicone additive present in the amount of 0.1 to 5 wt. %, more specifically, 0.3 to 2.5 wt. %, more specifically, 0.4 to 1.0 wt. %; and optional polymerization initiator present in the amount of 0 to 10 wt. %, specifically 0.1 to 5 wt. %, more specifically 0.5 to 3 wt. %, wherein weight is based on the total weight of the coating composition.

The surface of the polymeric film substrate opposite the coating can be subsequently printed, marked (e.g., with a laser), or decorated, for example, with markings selected from the group consisting of alphanumerics, graphics, symbols, indicia, logos, aesthetic designs, multicolored regions, and a combination comprising at least one of the foregoing. In some cases, the coated polymeric film can be used solely as a protective film optionally shaped, without printing. The coated polymeric film can also be subjected to printing with ink and shaped into a three-dimensional film for specific applications.

If the final piece is three dimensional, there are various techniques for forming three-dimensional IMD parts. For example, for parts having a draw depth greater than or equal to 1 inch (2.54 centimeters (cm)), thermoforming or variations of thermoforming can be employed. Variations include but are not limited to vacuum thermoforming, zero gravity thermoforming, plug assist thermoforming, drape forming, snap back thermoforming, pressure assist thermoforming, and high pressure thermoforming (i.e., forming with pressures above 1 atmosphere (101 kiloNewtons per square meter). For parts containing detailed alphanumeric graphics or draw depths less than 1 inch (2.54 cm), cold forming techniques are exemplary. These include but are not limited to embossing, matched metal forming, drape forming, bladder or hydro forming, pressure forming, or contact heat pressure forming.

If less than 20 wt. % of the urethane acrylate component is used, flexibility and overall toughness can suffer. If more than 90 wt. % is used, by weight of the total coating composition, the viscosity of the composition can be undesirably high and, thus, make application of the coating composition difficult. Similarly, if less than 20 wt. %, by weight of the total coating composition of the epoxy acrylate oligomer is used, flexibility and overall toughness can suffer.

The urethane acrylate can include a compound produced by reacting an aliphatic isocyanate with an oligomeric diol such as a polyester diol or polyether diol to produce an isocyanate capped oligomer. This oligomer is then reacted with hydroxy ethyl acrylate to produce the urethane acrylate.

The urethane acrylate oligomer specifically can be an aliphatic urethane acrylate, for example, a wholly aliphatic urethane (meth)acrylate oligomer based on an aliphatic polyol, which is reacted with an aliphatic polyisocyanate and acrylated. In one embodiment, it can be based on a polyol ether backbone. For example, an aliphatic urethane acrylate oligomer can be the reaction product of (i) an aliphatic polyol; (ii) an aliphatic polyisocyanate; and (iii) an end capping monomer capable of supplying reactive terminus. The polyol (i) can be an aliphatic polyol, which does not adversely affect the properties of the composition when cured. Examples include polyether polyols; hydrocarbon polyols; polycarbonate polyols; polyisocyanate polyols, and mixtures thereof.

A representative polyether polyol is based on a straight chain or branched alkylene oxide of one to about twelve carbon atoms. The polyether polyol can be prepared by any method known in the art. It can have, for example, a number average molecular weight ($M_n$), as determined by vapor pressure osmometry (VPO), per ASTM D-3592, sufficient to give the entire oligomer based on it a molecular weight of not more than about 6000 Daltons, specifically not more than about 5000 Daltons, and more specifically not more than about 4000 Daltons. Such polyether polyols include but are not limited to polytetramethylene polyol, polymethylene oxide, polyethylene oxide, polypropylene oxide, polybutylene oxide, and a mixture comprising at least one of the foregoing.

Representative hydrocarbon polyols which can be used include but are not limited to those based on a linear or branched hydrocarbon polymer having a number average molecular weight of 600 to 4,000 such as fully or partially hydrogenated 1,2-polybutadiene; 1,2-polybutadiene hydrogenated to an iodine number of 9 to 21; and fully or partially hydrogenated polyisobutylene. Unsaturated hydrocarbon polyols are less desirable because the oligomers made from them, when cured, are susceptible to oxidation.

Representative polycarbonate polyols include but are not limited to the reaction products of dialkyl carbonate with an alkylene diol, optionally copolymerized with alkylene ether diols.

The polyisocyanate component (ii) can be essentially non-aromatic, less than five percent, specifically less than one percent, more specifically zero wt. %, based upon a total weight of the polyisocyanate component. For example, non-aromatic polyisocyanates of 4 to 20 carbon atoms can be employed. Saturated aliphatic polyisocyanates include, but are not limited to, isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1, 6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and a mixtures comprising at least one of the foregoing.

The reaction rate between the hydroxyl-terminated polyol and a diisocyanate can be increased by use of a catalyst in the amount of 100 to 200 parts per million (ppm) by weight. Catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine, dimethylethylamine, morpholine, N-ethyl morpholine, piperazine, N,N-dimethyl benzylamine, N,N-dimethyl laurylamine, and a mixture comprising at least one of the foregoing.

The end capping monomer (iii) can be one, which is capable of providing acrylate or methacrylate termini. Exemplary hydroxyl-terminated compounds which can be used as the end capping monomers include but are not limited to hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and the like. A specific exemplary end capping monomer is hydroxyethyl acrylate or hydroxyethyl methacrylate.

The functionality of the urethane acrylate is the number of acrylate or methacrylate termini in the oligomer. More specifically, urethane acrylates that are trifunctional acrylates can be used, meaning that the functionality is 3 on average to within the closest integer. As used herein, the term "trifunctional aliphatic urethane acrylate" or triacrylate" will refer to oligomers in which the number of acrylate groups are in the range of about 2.5 to 3.5 on average.

Some commercially available oligomers which can be used in the coating composition can include, but are not limited to, trifunctional aliphatic urethane acrylates that are part of the following families: the PHOTOMER-™ Series of aliphatic urethane acrylate oligomers from IGM Resins, Inc., St. Charles, Ill.; the Sartomer CN Series of aliphatic urethane acrylate oligomer from Sartomer Company, Exton, Pa.; the Echo Resins Series of aliphatic urethane acrylate oligomers from Echo Resins and Laboratory, Versailles, Mo.; the BR Series of aliphatic urethane acrylates from Bomar Specialties, Winsted, Conn.; and the EBECRYL™ Series of aliphatic urethane acrylate oligomers from Cytec Industries, Smyrna, Ga. For example, the aliphatic urethane acrylates can be PHOTOMER 6892 or PHOTOMER 6210 oligomers from IGM Resins, Inc., St. Charles, Ill. and the epoxy acrylate can be CN131B oligomer from Sartomer Company, Exton, Pa.

Another component of the coating composition can be a reactive monomer diluent having one or more acrylate or methacrylate moieties per monomer molecule, and which is one which results in a hard curing (high modulus) coating, of suitable viscosity for application conditions. The monomer is capable of lowering the viscosity of the overall liquid composition to within the range of 1 to 10,000 cps (centipoises) at 25° C., specifically 5 to 1,000 cps, and more specifically 7 to 50 cps, as measured by a Brookfield Viscometer, Model LVDV-II+, spindle CPE-51, at 25° C. If a viscosity higher than about 10,000 cps results, the coating composition can be used if certain processing modifications are effected, e.g., increased heating of the dies through which the coating composition is applied.

The reactive acrylate monomer diluent can be mono-, di-, tri-, tetra- or penta functional. In one embodiment, di-functional monomers are employed for the desired flexibility and adhesion of the coating. The monomer can be straight- or branched-chain alkyl; cyclic; or partially aromatic. The reactive monomer diluent can also comprise a combination of monomers that, on balance, result in a suitable viscosity for coating composition, which cures to form a hard, flexible material having the desired properties.

The reactive monomer diluent, within the limits discussed above, can include monomers having a plurality of acrylate or methacrylate moieties. These can be di-, tri-, tetra- or penta-functional, specifically di-functional, in order to increase the crosslink density of the cured coating and therefore to increase modulus without causing brittleness. Examples of polyfunctional monomers include, but are not limited, to $C_6$-$C_{12}$ hydrocarbon diol diacrylates or dimethacrylates such as 1,6-hexanediol diacrylate and 1,6-hexanediol dimethacrylate; tripropylene glycol diacrylate or dimethacrylate; neopentyl glycol diacrylate or dimethacrylate; neopentyl glycol propoxylate diacrylate or dimethacrylate; neopentyl glycol ethoxylate diacrylate or dimethacrylate;

2-phenoxylethyl (meth)acrylate; alkoxylated aliphatic (meth)acrylate; polyethylene glycol (meth)acrylate; lauryl (meth)acrylate, isodecyl (meth)acrylate, isobornyl (meth)acrylate, tridecyl (meth)acrylate; and mixtures comprising at least one of the foregoing monomers. In one embodiment, the specific monomer is 1,6-hexanediol diacrylate (HDODA), alone or in combination with another monomer.

The coating composition can further comprise an epoxy acrylate oligomer containing an acrylate functional group, specifically, 1 to 5, and more specifically, 1 to 3. The epoxy acrylate oligomer can have a viscosity of less than or equal to 500 centipoise (cps), specifically, less than or equal to 300 cps, more specifically, less than or equal to 275 cps, and still more specifically, less than or equal to 250 cps. The epoxy acrylate oligomer can also have a tensile strength as measured according to ASTM D882-10 of less than or equal to 1,500 pounds per square inch (psi) (10 MegaPascals (MPa)), specifically, less than or equal to 1,000 psi, (7 MPa), more specifically, less than or equal to 900 psi (6 MPa), and still more specifically, less than or equal to 750 psi (5 MPa). The epoxy acrylate oligomer can also have an elongation % at break of less than or equal to 65%, specifically, less than or equal to 50%, more specifically, less than or equal to 46%, still more specifically, less than or equal to 45%, and more specifically, still, less than or equal to 40% according to ASTM D882-10. The glass transition temperature of the epoxy acrylate oligomer can be greater than or equal to 10° C., specifically, greater than or equal to 12° C., more specifically, greater than or equal to 13° C., still more specifically, greater than or equal to 15° C., and even more specifically, greater than or equal to 20° C. As mentioned, the epoxy acrylate oligomer can improve formability and the ability to stretch or thin of a coated thermoplastic film comprising the coating composition described herein without sacrificing abrasion resistance or impact resistance.

Another component of the coating composition can be an optional silicone additive (e.g., a silicone release additive). For example, the silicone release additive can comprise a siloxane polymer, including but not limited to, a polydimethysiloxane acrylate copolymer (e.g., a di-functional acrylate copolymer), a polyether polydimethysiloxane (e.g., a polyether modified acryl functional polydimethylsiloxane), polyalkyleneoxide modified polydimethylsiloxane copolymer, palmitic acid, and combinations comprising at least one of the foregoing. For example, the silicone additive can be Silmer ACR Di-1508 from Siltech LLC, Dacula. Ga, BYK-SILCLEAN 3710 from BYK-Chemie, Wesel, Germany, or CoatOSil 7602 from Momentive Performance Materials Holdings LLC. When present, the silicone additive can be present in an amount of 0.1 to 3 wt. %.

Another component of the coating composition can be an optional polymerization initiator such as a photoinitiator. Generally, a photoinitiator is used if the coating composition is to be ultraviolet cured; if it is to be cured by an electron beam, the coating composition can comprise substantially no photoinitiator.

When the coating composition is cured by ultraviolet light, the photoinitiator, when used in a small but effective amount to promote radiation cure, can provide reasonable cure speed without causing premature gelation of the coating composition. Further, it can be used without interfering with the optical clarity of the cured coating material. Still further, the photoinitiator can be thermally stable, non-yellowing, and efficient.

Photoinitiators can include, but are not limited to, the following: hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxy-phenyl acetophenone; bis(2,6-dimethoxybenzoyl)-2,4-, 4-trimethylpentylphosphine oxide; 2,4,6-trimethylbenzoyldiphenylphosphine oxide; 2,4,6-trimethylbenzoylethoxyphenylphosphine oxide; and mixtures of these.

Exemplary photoinitiators include phosphine oxide photoinitiators. Examples of such photoinitiators include the IRGACURE™ and DAROCUR™ series of phosphine oxide photoinitiators available from Ciba Specialty Chemicals; the ADDITOL™ series from Cytec Industries; the LUCIRIN™ series from BASF Corp.; and the ESACURE™ series of photoinitiators from Lamberti, s.p.a. Other useful photoinitiators include ketone-based photoinitiators, such as hydroxy- and alkoxyalkyl phenyl ketones, and thioalkylphenyl morpholinoalkyl ketones. Also suitable are benzoin ether photoinitiators. Specific exemplary photoinitiators are bis(2,4,6-trimethylbenzoyl)-phenylphosphine oxide supplied as IRGACURE™ 819 by Ciba-Geigy Corp. or 2-hydroxy-2-methyl-1-phenyl-1-propanone supplied as ADDITOL HDMAP™ by Cytec Industries.

The photoinitiator can be chosen such that the curing energy is less than 2.0 $J/cm^2$, and specifically less than 1.0 $J/cm^2$, when the photoinitiator is used in the designated amount.

The polymerization initiator can include peroxy-based initiators that can promote polymerization under thermal activation. Examples of useful peroxy initiators include benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di (trimethylsilyl)peroxide, trimethylsilylphenyltriphenylsilyl peroxide, and the like, and combinations comprising at least one of the foregoing polymerization initiators.

The composition can optionally further comprise an additive selected from flame retardants, antioxidants, thermal stabilizers, ultraviolet stabilizers, dyes, colorants, anti-static agents, and the like, and a combination comprising at least one of the foregoing additives, so long as they do not deleteriously affect the polymerization of the composition. Selection of particular additives and their amounts can be performed by those skilled in the art.

The coating composition can provide a hard coat having advantageous properties, as described in more detail in the examples below. In one embodiment, the coating composition can have a Tabor Abrasion Delta Haze, as measured after 100 cycles using 500 gram load and CS-10F Taber abrasion wheel under ASTM D1044-08 of less than or equal to 10 percent, more specifically less than or equal to 5 percent. The hard coat can also have a minimum adhesion of 5B as measure by ASTM D3002-07 and a minimum pencil hardness of B or higher as measured using a Elcometer™ 3086 motorized pencil hardness tester (Elcometer, Inc.; Rochester Hills, Mich.) at 500 g load and Mitsubishi pencils (Mitsubishi Pencil Co Ltd) by ASTM D3363-05.

The polymeric film substrate can comprise various polymers. For example, the film substrate can comprise polycarbonates, polyesters (e.g., poly(ethylene terephthalate), acrylates (e.g., poly(methyl methacrylate)), polystyrenes (e.g., polyvinyl chloride polystyrene, polyvinylidene chlorides, polyolefins (e.g., polypropylene, polyethylene), fluoride resins, polyamides, polyphenylene oxides, and combinations comprising at least one of the foregoing. In one embodiment, the polymer film substrate can specifically comprise polycarbonate.

Modifiers can be used for gaining adhesion to various substrates. Monomers selected for their high diffusion rates into said substrates can be one such modification route for improved adhesion. Solvent modifications of can also impart improved adhesion as solvent modifiers can promote higher diffusion by opening the surface structure of the film substrate. Secondary surface treatments of the film substrate can also be employed for improvements in adhesion by an increase in surface energy through flame, corona, plasma, and ozone treatment of the film substrate prior to application of coatings. Adhesion to the film substrate surface can also be improved via use of coupling agents or adhesion promoters such as silanes applied to the surface of the film substrate. These modifications are known to assist in wetting rates for the applied coatings and can increase the amount of diffusion prior to cure.

The polycarbonate film substrate can comprise polycarbonate made by the polymerization of dimethyl bisphenol cyclohexane (DMBPC) monomer, for example, as the predominant or sole hydroxy monomer, hereafter referred to as DMBPC polycarbonate. More specifically, the thermoplastic film can comprise a blend of a polycarbonate comprising repeat units from, and made by the polymerization of, dimethyl bisphenol cyclohexane (DMBPC) monomer and a polycarbonate comprising repeat units from, and made by the polymerization of, bisphenol A monomer, for example, as the predominant or sole hydroxy monomer, hereafter referred to as bisphenol A polycarbonate.

The film substrate of the coated polycarbonate thermoplastic film can be a multilayer film comprising a layer that is a blend of DMBPC polycarbonate in an amount of 0 to 50 wt. % and a bisphenol A polycarbonate in the amount of 50 to 100 wt. %, where weight percents are based on the total weight of the composition in the layer.

The film substrate can also be a co-extruded multilayer film substrate comprising a first layer (which can be the cap or upper layer with respect to the molded article and the layer having the coating) comprising a blend of DMBPC polycarbonate and bisphenol A polycarbonate and a second adjacent layer comprising bisphenol A polycarbonate without DMBPC polycarbonate. The first layer is, for example, 0 to 50%, specifically 10 to 40%, of the thickness of the multilayer film substrate, and the second layer is 50% to 100%, specifically 60 to 90%, of the thickness of the multilayer film.

The film substrate can be 25 to 1500 micrometers thick, specifically 100 to 800 micrometers, and the coating can be 1 to 50 micrometers thick, specifically 3 to 30 micrometers.

Alternatively, the film substrate can be a monolithic or single layer of bisphenol A polycarbonate. Other types of polycarbonate compositions or polycarbonate blends can be used in a monolithic or multilayer film, which polycarbonates are described in greater detail below.

The polymeric film substrate (e.g., polycarbonate film substrate) disclosed herein can be made by a process wherein the coating composition is applied onto a moving web of the film substrate at a wet coating thickness of, for example, 3 to 30 micrometers, wherein the wet coating is nipped between a smooth metal plate used as a casting roll, for example a chrome plated steel roll, and a rubber or elastomeric roll and, while the coated polymeric film is in contact with the chrome plated steel roll, and is exposed to UV energy to activate polymerization of the coating, wherein the casting roll temperature is about 100 to 200° F. (37.8 to 93.3° C.), more specifically, 130 to 150° F. (54.4 to 65.6° C.).

A molded article is herein disclosed comprising the above-described coated polymeric film after the film is printed (decorated) on one surface thereof with a print (decoration) and bonded to an injection molded polymeric base structure. The coated polymeric film can be cold formed or thermoformed into a three-dimensional shape matching the three-dimensional shape of the injection molded polymeric base structure.

The polymeric base structure can be an injection molded polymer composition or "resin" that can also be made of a polycarbonate or blend of polycarbonate with one or more other polymer. However, polycarbonates are not required for the base polymer composition. Such base polymers can include, for example, a blend of bisphenol A polycarbonate and a cycloaliphatic polyester comprised of cycloaliphatic diacid and cycloaliphatic diol units (polycyclohexane dimethanol cyclohexane dicarboxylate), ABS (an acrylonitrile-butadiene-styrene block copolymer), ABS polymer blends, aromatic polycarbonate/ABS polymer blends, and combinations comprising at least one of the foregoing. Specifically, the base polymeric structure can comprises a blend of an aromatic polycarbonate and a polymer selected from the group consisting of PBT (poly(butylene terephthalate)), PCCD (polycyclohexane dimethanol cyclohexane dicarboxylate), PET (poly(ethylene terephthalate)), ABS (acrylonitrile-butadiene-styrene block copolymer), PMMA (poly (methyl methacrylate)), PETG (polyethylene terephthalate glycol), and mixtures of at least one of the foregoing polymers.

Various thermoplastic resins that can be used in the base polymer structure are available from SABIC Innovative Plastics Company under the trademarks: LEXAN™ (an aromatic polycarbonate), CYCOLAC™ (an acrylonitrile-butadiene-styrene polymer), CYCOLOY™ (an aromatic polycarbonate/ABS polymer composition), XYLEX™ (an aromatic polycarbonate/amorphous polyester composition), XENOY™ (an aromatic polycarbonate/polybutylene terephthalate polymer composition), VALOX™ (polybutylene terephthalate) resin, including homopolycarbonates, copolycarbonates, copolyester carbonates, and combinations comprising at least one of the foregoing.

In one embodiment, the injection molded base polymer can be a transparent polycarbonate. Higher flow transparent materials (such as LEXAN SP™, a super high flow polycarbonate grade produced by SABIC Innovative Plastics) can provide an improvement in terms of viscosity, especially for thinner-walled IMD molds where there are fast injection speeds.

A polycarbonate polymer for use in the base polymer structure can consist of an aromatic polycarbonate of more than 99 wt. % of bisphenol-A polycarbonate made from 2,2-bis(4-hydroxy phenyl)propane, (i.e., bisphenol-A).

Also disclosed herein is a method of molding an article, comprising placing the above-described decorative film into a mold, and injecting a base polymer composition into the mold cavity space behind the decorative film, wherein the decorative film and the injection molded base polymer composition form a single molded part or article.

According to an embodiment, molded articles can be prepared by: printing a decoration on a surface of a coated polycarbonate film substrate, for example by screen printing to form a decorative film; forming and optionally trimming the decorative film (including printed substrate) into a three-dimensional shape; fitting the decorative film into a mold having a surface which matches the three-dimensional shape of the decorative film; and injecting a base polymer composition, which can be substantially transparent, into the mold cavity behind the decorative film to produce a one-piece, permanently bonded three-dimensional article or product.

For instance, for some cell phones or other wireless electronic devices, a film with ink patterns can be back molded with a transparent resin to mold the complete front cover or housing. This can be done so that information can be visually accessed by the product's user through a transparent window which is integrated into the structural resin of the product's design. Data can be transferred to/from the electronic device to its server by Infrared Radiation (IR) through the transparent window. Holes in the decorative film can be provided to expose the transparent injected molded base resin for either data transfer or aesthetic purposes. The coated films disclosed herein can also be used for exterior automotive insert mold decoration (IMD) applications, among other uses.

The surface of the polycarbonate film substrate opposite the coating can be subsequently printed, laser marked, or decorated, for example, with markings selected from the group consisting of alphanumerics, graphics, symbols, indicia, logos, aesthetic designs, multicolored regions, and a combination comprising at least one of the foregoing. In some cases, the coated polycarbonate film can be used solely as a protective film optionally shaped, without printing. The coated polycarbonate film can also be subjected to printing with ink and shaped into a three-dimensional film for specific applications. Optional shaping (e.g., forming to shape) can include, for example, non-planar shapes or a complex geometry in cross-section of the initial sheet. A planar sheet can be shaped into an irregular shape comprising a plurality of bends or inflections. A shaped sheet can comprise a plurality of protuberances or indentations that define a space or volume diverging from the original plane of coated thermoplastic film.

If the final piece is three dimensional, there are various techniques for forming three-dimensional IMD parts. For example, for parts having a draw depth greater than or equal to 1 inch (2.54 cm), thermoforming or variations of thermoforming can be employed. Variations include but are not limited to vacuum thermoforming, zero gravity thermoforming, plug assist thermoforming, snap back thermoforming, drape forming, pressure assist thermoforming, and high pressure thermoforming (i.e., at greater than 1 atmosphere (101 kiloNewtons per square meter). For parts containing detailed alphanumeric graphics or draw depths less than 1 inch (2.54 cm), cold forming techniques are exemplary. These include but are not limited to embossing, matched metal forming, drape forming, bladder or hydro forming, pressure forming, or contact heat pressure forming.

For IMD processes, high temperature, formable inks can be used for graphics application. Second surface decoration can employ more robust ink systems to provide adequate ink adhesion during the molding process. Moreover, in applications such as light assemblies where light transmission is important, dye inks can be used rather than pigmented inks so as not to affect light transmission and haze readings. Possible inks include but are not limited to the following: Naz-dar 2400, 3400, and 8400 CVM; Coates C-37 Series and Decomold Ultrabond DMU; Marabuwerke IMD Spezialfarbe 3061, IMD 5001 with tie layer, and MPC; Nor-cote (UK) IMD and MSK Series' with tie layer; Sericol Techmark MTS with tie layer and Techmark IMD; Proell Noriphan N2K, M1, M2, HTR, HTR HF, and XWR; Seiko Advance MP4 Slow Dry, KKS Super Slow Dry; Seiko Advance AKE(N) w/N3A, JT10, JT25, or JT20 binder; Teikoku IPX, IPX-HF, ISX, ISX-HF, or INQ series w/IMB003, IMB HF-009, or IMB HF-006 binder; Jujo 3300 series; Jujo 3200 series with G2S binder.

Prototype molds can be constructed from common materials such as plaster, hard woods, fiberglass, syntactic foam and silicone. These materials are relatively easy to work with and allow minor modifications. It is common practice for designers to experiment with IMD to cast a silicone forming mold off an existing injection mold. For example, production forming tools should be constructed of durable materials such as cast or machined aluminum, steel or metal filled epoxy. Conductive molds should be internally heated to a temperature of 250° F. (121° C.).

The injection molded article or part can contract in size once it is removed from the mold and allowed to cool. The amount of shrinkage depends on the material selected, but it is predictable and can be accounted for when calculating the mold dimensions. The same is true for the expansion of the mold at operating temperatures. For example, LEXAN™ polycarbonate film can typically shrink approximately 0.5 to 0.9% after forming, depending on the mold. The thermal expansion properties of the mold material at an operating temperature of 250° F. (121° C.) can be subtracted from the film shrinkage number to obtain accurate mold dimensions. In addition, draft angles of 5 to 7 degrees can be suggested to facilitate part removal from male molds. Female molds require less draft (1 to 2 degrees).

Considerations in gating include part design, flow, end use requirements, and location of in-mold graphics. The standard guidelines of traditional gating can apply to IMD along with several extra considerations. For example, one gate can be used whenever possible to minimize the potential for wrinkling the film. Gates can be located away from end-use impact as well as to provide flow from thick to thin sections to minimize weld lines. Gates can also be located at right angles to the runner to minimize jetting, splay and gate blush. Large parts requiring multiple gates can include gate positions close enough together to reduce pressure loss. Sequential gating can be used to prevent folding of the film at weld lines. Gate land lengths can be kept as short as possible. An impinging gate can be used to ensure that the incoming flow is directed against the cavity wall or core to prevent jetting. Venting (particularly full perimeter venting) can be accomplished by knock outs, cores, and parting lines and can be used whenever possible to avoid trapped gas that can burn and rupture the film. In addition, flow restrictions near gate areas can increase the potential for wash out due to increased shear. If bosses, core shutoffs, etc., are needed near a gate, rounded features or corners can be used to reduce shear. Finally, care can also be taken to ensure that the gating distributes the injection pressure over a large area, thus reducing the shear forces at the gate. Examples of gates that can accomplish this include fan gates and submarine gates that enter the part via a rib. It is common to add a puddle or thicker area at the gate entrance point for gates like valve gates, hot drops, cashew gates in order to create a pressure drop and reduce potential for washing the ink away at the gate.

When selecting a base polymer composition (also referred to as "resin"), it is advantageous that the resin's viscosity be sufficiently low such that the pressure necessary to inject it into the mold can be reduced. In addition, the injection can be profiled so that the viscosity of the injected material maintained at a sufficiently low level in the gate area and can be raised after a suitable skin layer is established near the gate. At lower viscosity, the shear force of the injected material is lower and is therefore less likely to disturb the ink on the second surface of the substrate.

The decorations or graphics can be printed on the film substrate so that they extend beyond the gating area and into the runner system. In this case, if the ink is disturbed by the flow of the injected material, it can be disturbed in the runner area that can be trimmed off after the part is ejected from the mold. Runnerless systems or heated gating systems can also be employed. With a runnerless system, the drop diameter can be large enough to sufficiently distribute the pressure or flow into a part, such as a rib. With a heated gating system, the tips of the heated gates can be maintained at a temperature sufficiently below the softening temperature of the film substrate so as to prevent film substrate deformation.

Screen-printing is an example of a technique for producing graphics on coated film substrates of the present invention. Screen-printing is essentially a stencil printing process, which can now be generated by computer with the aid of various software packages. Its ability to vary and control ink thickness accurately has made it an extremely useful process for the decoration of many different types of plastic substrates.

In screen printing, a screen or stencil is prepared and bonded to a fine weave fabric, which is then tensioned in a rigid frame. Frames can be made of either wood or metal, with metal being preferred. The frame can be dimensionally stable and able to withstand handling during the printing process. Screen fabrics are generally made from metallized polyester, nylon, stainless steel, and most commonly, polyester. The fabric can be tightly woven under precise control using dimensionally exact filaments. There are a number of variables that can affect ink deposit, including thread diameter, squeegee angle and hardness, emulsion thickness, etc. Higher mesh screens are suggested for formed IMD applications.

A typical screen printing process involves the use of a flat bed where the film substrate is held by vacuum during printing. A frame holder positions the screen and holds it both vertically and horizontally during the printing process. With the screen lowered over the substrate bed and held at the off contact distance by the press, the squeegee carrier moves the blade across the screen at a preset speed, pressure, stroke and angle.

It is important to register artwork during a screen printing operation. This is normally done by locking the frame into a holder that aligns the frame using pins or holders. The pin alignment method is often used because the artwork can be aligned along with the screen frame. Alignment of the substrate with the print image can be done through the use of edge guides, mechanical stops or automatic devices. The first color can be aligned by this method and subsequent colors aligned through the use of targets or gauge marks which are printed alongside the artwork.

Once the ink is printed, it can be either dried or cured depending on the ink technology used. If the ink is solvent or water based, then a gas fired or electric dryer can be used to dry the ink. When printing on plastic films, the temperature and dwell time in the oven can be controlled to avoid distorting the film. If a solvent ink is used, an oven with good air flow can be used to dissipate the fumes. It is also possible to use an infrared dryer on some ink types, in which temperature control of the system can be applied. If the ink is UV curable, many commercial systems and units are available for curing such reactive ink types.

Printing or decorating on the coated polycarbonate film can be performed on the underside of the polycarbonate film substrate but can also or alternatively be on the upper side of the polycarbonate film substrate, i.e. the surface which becomes the interface between the polycarbonate film substrate and hard coat. Generally, the hard coat is not printable but can be decorated by other means, such as laser marking.

Among desirable performance properties of a transparent decorative film and articles in which it is contained is that it can (a) pass a scribe adhesion test, (b) have a maximum percent haze, (c) be formed, and/or (d) have a birefringence of less than or equal to 20 nm. A low birefringence overlay film can be used for three-dimensional thermoformed (vacuum or pressure forming) articles prepared by IMD process for applications that require tight graphics registration. Various advantageous properties of the present coated film are described below in greater detail in the examples.

The coated polymeric substrate disclosed herein can be an extruded sheet or film that can be produced by a method comprising feeding a polycarbonate composition or resin into an extruder which heats the resin above its glass transition temperature (Tg), thereby producing a viscous melt of the thermoplastic material. The term "film" or "sheet" is used interchangeably herein. Such extruded films can have a final thickness of about 1 to about 30 mils (25 to 762 micrometers). In an embodiment, a viscous melt of the composition can be passed, under pressure provided by the extruder, through an opening in a die, which opening typically has the shape of an elongated rectangle or slot. The viscous melt assumes the shape of the die slot, thereby forming a continuous sheet or film of molten extrudate. The die center zone temperatures can be, for example, in the range of 550 to 650° F. (288 to 343° C.). The die edge zone temperatures can be higher to compensate for the film edge cooling at a faster rate than the film center. The film of molten extrudate can then be passed through finishing apparatus to form the sheet or film and used as a film substrate to be coated.

A finishing apparatus, for example, can comprise (as described, for example, in U.S. Pat. No. 6,682,805) a two-roll finishing or polishing stack comprising an opposing upper roll and lower roll spaced apart by a distance that generally corresponds to the desired thickness of the finished thermoplastic sheet or film. Such rolls are also sometimes referred to as calendaring rolls with a gap or nip there between. A typical finishing stack comprises opposing upper and lower steel roller. The upper roll can be covered with an elastomeric material, such as rubber, and the lower roll can have a chrome plated smooth surface. These rolls can be cooled internally by passing a fluid through the interior of the rolls using known apparatus and methods for cooling, by which the temperature of the surface of the rolls can be controlled by this method. The film can be passed through an additional nip in some cases. The film can also pass through a thickness scanner, through pull rolls, and wound onto a winder.

The temperature of the rolls can be controlled to a temperature that is below Tg of the thermoplastic material that is being processed. In the gap between the rolls, the surfaces of the sheet or film can be abruptly vitrified via contact with the calendaring rolls. Therefore, upon contact with the rolls, the interior portion of the film can remain in the thermoplastic or molten state.

As used herein, with respect to embodiments of the coated extruded polycarbonate film substrate and/or the injection molded base polymer (which optionally comprises a polycarbonate resin), the term "polycarbonate" means compositions having repeating structural carbonate units of formula (1):

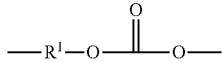
(1)

in which at least about 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2):

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3)

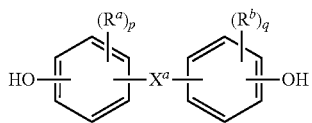
(3)

wherein $R^a$ and $R^b$ each represent a halogen or $C_{1-42}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q is each 1, and $R^a$ and $R^b$ are each a $C_{1-3}$ alkyl group, specifically methyl, disposed meta to the hydroxy group on each arylene group.

In one embodiment, $X^a$ is a substituted or unsubstituted $C_{3-18}$ cycloalkylidene, a $C_{1-25}$ alkylidene of formula —C($R^e$)($R^d$)— wherein $R^e$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

A specific example wherein $X^a$ is a substituted cycloalkylidene is the cyclohexylidene-bridged, alkyl-substituted bisphenol of formula (4)

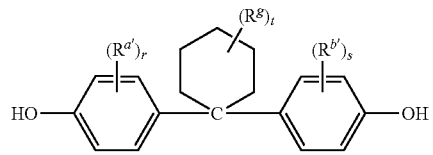
(4)

wherein $R^{a\prime}$ and $R^{b\prime}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a\prime}$ and $R^{b\prime}$ are disposed meta to the cyclohexylidene bridging group. The substituents $R^{a\prime}$, $R^{b\prime}$, and $R^g$ can, when comprising an appropriate number of carbon atoms, be straight chain, cyclic, bicyclic, branched, saturated, or unsaturated. In an embodiment, $R^{a\prime}$ and $R^{b\prime}$ are each independently $C_{1-4}$ alkyl, $R^g$ is $C_{1-4}$ alkyl, r and s are each 1, and t is 0 to 5. In another specific embodiment, $R^{a\prime}$, $R^{b\prime}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-S-one). Such cyclohexane-containing bisphenols, for example the reaction product of two moles of a phenol with one mole of a hydrogenated isophorone, are useful for making polycarbonate polymers with high glass transition temperatures and high heat distortion temperatures.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

Specific examples of bisphenol compounds of formula (3) include 1,1-bis(4-hydroxyphenyl)methane, 1,1-bis(4-hydroxyphenyl)ethane, 2,2-bis(4-hydroxyphenyl) propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of about 0.3 to about 1.5 deciliters per gram (dl/gm), specifically about 0.45 to about 1.0 dl/gm. The polycarbonates can have a weight average molecular weight of about 10,000 to about 200,000 Daltons, specifically about 20,000 to about 100,000 Daltons, as measured by gel permeation chromatography (GPC), using a crosslinked styrene-divinylbenzene column and calibrated to polycarbonate references. GPC samples are prepared at a concentration of about 1 mg per ml, and are eluted at a flow rate of about 1.5 ml per minute.

"Polycarbonates" as used herein further include homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like.

In one embodiment, J is a $C_{2-30}$ alkylene group having a straight chain, branched chain, or cyclic (including polycyclic) structure. In another embodiment, J is derived from an aromatic dihydroxy compound of formula (3) above. In another embodiment, J is derived from an aromatic dihydroxy compound of formula (4) above.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor, such as carbonyl chloride, in the presence of a catalyst such as triethylamine and/or a phase transfer catalyst, under controlled pH conditions, e.g., about 8 to about 12. The most commonly used water immiscible solvents include methylene chloride, 1,2-dichloroethane, chlorobenzene, toluene, and the like.

Branched polycarbonate blocks can also be used, and they can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates.

The injection molded base polymers can further include impact modifier(s) that do not adversely affect the desired composition properties, including light transmission. Impact modifiers can include, for example, high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

Impact modifiers, when used, can be present in amounts of 1 to 30 wt. %, based on the total weight of the polymers in the composition.

The thermoplastic composition for the polymeric film substrate or injection molded base polymer can include various additives (e.g., filler(s) and/or reinforcing agent(s)) ordinarily incorporated in resin compositions of this type, with the proviso that the additives are selected so as to not significantly adversely affect the desired properties of the extrudable composition, for example, light transmission of greater than 50%. Combinations of additives can be used. Such additives can be mixed at a suitable time during the mixing of the components for forming the composition.

Other optional additives for thermoplastic compositions, either extruded films or injection molded resins, include antioxidants, flow aids, mold release compounds, UV absorbers, stabilizers such as light stabilizers and others, flame retardants, lubricants, plasticizers, colorants, including pigments and dyes, anti-static agents, metal deactivators, and combinations comprising one or more of the foregoing additives. Such additives are selected so as to not significantly adversely affect the desired properties of the composition.

The coated polymeric films and decorative films disclosed herein have numerous applications, for example, cell phone covers (top, bottom, flip); cell phone lenses; cell phone key pads; lap and computer covers; key boards; membrane switches; adhesive labels; buttons and dials of interior automotive interfaces; heat ventilation & air conditioning panels; automotive clusters; control panels for appliances (washer, dryer, microwave, air conditioner, refrigerator, stove, dishwasher, etc.); housings, lenses, keypads, or covers for hand held devices (blood analyzers, calculators, MP3 or MP4 players, gaming devices, radios, satellite radios, GPS units, etc.); touch panel displays; screens, keypads, membrane switches, or other user interfaces for ATMs, voting machines, industrial equipment, and the like; housings, lenses, keypads, membrane switches, or covers for other consumer and industrial electronic devices (TVs, monitors, cameras, video camcorders, microphones, radios, receivers, DVD players, VCRs, routers, cable boxes, gaming devices, slot machines, pachinko machines, cash registers, hand held or stationary scanners, fax machines, copiers, printers, etc); covers and buttons of memory storage devices and flash drives; covers and buttons for the mouse, blue tooth transmitters, hands free devices, headsets, earphones, speakers, etc; labels, housings, lenses, touch interfaces for musical instruments such as electronic key boards or periphery equipment such as amplifiers, mixers, and sound boards; and displays, covers, or lenses of gauges, watches, and clocks.

EXAMPLES

Coating Composition

Oligomer selection was made to provide a range of flexibility, adhesion to the substrate, scratch, abrasion, and chemical resistance. A difunctional monomer, 1,6-hexanediol diacrylate (HDODA), diluent was used to reduce coating viscosity and to enhance adhesion properties. The coatings were formulated as 100% solids (no water or solvent present) and applied with heat (to reduce viscosity further on application to 50 to 200 cps). The coatings were preheated prior to application to the substrate to temperatures of 120 to 150° F. (48.9 to 65.6° C.) that allowed acceptable viscosities for the application process. Functionality levels of the various components were varied from low to high to determine the effect on Taber haze and flexibility of the cured film product. The monomer and oligomers used in the following examples of coating compositions are listed in Tables 1 and 2 along with corresponding values of functionality, tensile strength, elongation, glass transition temperature (Tg), viscosity, and supplier. The tensile strength at break and elongation was based on ASTM D882, the standard test method for tensile properties of thin plastic films.

TABLE 1

| Component Number | Product Name | Functionality | Tensile Strength (psi) | Elongation % | Supplier |
|---|---|---|---|---|---|
| Monomer 1 | Photomer 4017 | 2 | | | IGM resins |
| Oligomer 1 | Photomer 6892 | 3 | 1300 | 47 | IGM resins |
| Oligomer 2 | Ebecryl 8405 | 4 | 4,000 | 29 | Cytec Industries |
| Oligomer 3 | Ebecryl 4833 | 2 | 7,800 | 120 | Cytec Industries |
| Oligomer 4 | Ebecryl 8411 | 2 | 1,170 | 320 | Cytec Industries |
| Oligomer 5 | CN131B | 1 | 900 | 46 | Sartomer USA |
| Oligomer 6 | Photomer 6572 | 2 | 970 | 86 | IGM resins |
| Oligomer 7 | CN973J75 | 2 | 320 | 279 | Sartomer USA |
| Oligomer 8 | Ebecryl 8296 | 3 | | 18 | Cytec Industries |
| Oligomer 9 | Eternal 6148-J75 | 2 | | 239 | Eternal Chemical |
| Oligomer 10 | Photomer 6210 | 2 | 1,400 | 40 | IGM resins |
| Oligomer 11 | CN9002 | 2 | 185 | 116 | Sartomer USA |
| Oligomer 12 | CN2285 | 1 | 2,200 | 121 | Sartomer USA |
| Oligomer 13 | CN9009 | 2 | 4,850 | 140 | Sartomer USA |
| Oligomer 14 | Genomer 4256 | 2 | 29 | 145 | Rahn AG |
| Oligomer 15 | Genomer 4269/M22 | 2 | 29 | 46 | Rahn AG |
| Oligomer 16 | CN991 | 2 | 5375 | 79 | Sartomer USA |
| Oligomer 17 | Genomer 4217 | 2 | 400 | 40 | Rahn AG |
| Oligomer 18 | Ebecryl 8254 | 6 | 10,585 | 5 | Cytec Industries |
| Oligomer 19 | CN966J75 | 2 | 428 | 238 | Sartomer USA |
| Oligomer 20 | Genomer 1122 | 1 | 27 | 162 | Rahn AG |

TABLE 2

| Component Number | Product Name | Tg (° C.) | Viscosity at 25° C. (cps) | Supplier |
|---|---|---|---|---|
| Monomer 1 | Photomer 4017 | 43 | 9 | IGM resins |
| Oligomer 1 | Photomer 6892 | 14 | 33,000 | IGM resins |
| Oligomer 2 | Ebecryl 8405 | 30 | 85,000 | Cytec Industries |
| Oligomer 3 | Ebecryl 4833 | 47 | 110,000 | Cytec Industries |
| Oligomer 4 | Ebecryl 8411 | | 149,500 | Cytec Industries |
| Oligomer 5 | CN131B | 13 | 250 | Sartomer USA |
| Oligomer 6 | Photomer 6572 | −29 | 45,000 at 60° C. | IGM resins |
| Oligomer 7 | CN973J75 | −31 | 6,050 at 60° C. | Sartomer USA |
| Oligomer 8 | Ebecryl 8296 | −1 | 2,400 at 60° C. | Cytec Industries |
| Oligomer 9 | Eternal 6148-J75 | 20 | 90,000-150,000 | Eternal Chemical |
| Oligomer 10 | Photomer 6210 | 32 | 12,000 | IGM resins |
| Oligomer 11 | CN9002 | −50 | 45,000 | Sartomer USA |
| Oligomer 12 | CN2285 | 32 | 350 | Sartomer USA |
| Oligomer 13 | CN9009 | 40 | 3,000 at 60° C. | Sartomer USA |
| Oligomer 14 | Genomer 4256 | −24 | 12,000 in 80% Toluene | Rahn AG |
| Oligomer 15 | Genomer 4269/M22 | −15 | 55,000 | Rahn AG |
| Oligomer 16 | CN991 | 27 | 660 at 60° C. | Sartomer USA |
| Oligomer 17 | Genomer 4217 | −35 | 100,000 | Rahn AG |
| Oligomer 18 | Ebecryl 8254 | 73 | 2,500 | Cytec Industries |
| Oligomer 19 | CN966J75 | −33 | 105,000 | Sartomer USA |
| Oligomer 20 | Genomer 1122 | −3 | 30 | Rahn AG |

Photoinitiators were added to the coating blends in order to facilitate curing of the coating under UV exposure. Silicone-based additives were also added to the coating blends in order to improve leveling, flow, and release properties of the coating. The photoinitiators and additives listed in Table 3 were investigated.

TABLE 3

| Component | Trademark | Description | Source |
|---|---|---|---|
| Photoinitiator 1 | Additol HDMAP | 2-hydroxy-2-methyl-1-phenyl-1-propanone | Cytec Industries |
| Photoinitiator 2 | Irgacure 819 | Bis(2,4,6-trimethylbenzoyl)phenylphosphine oxide | Ciba-Geigy |
| Additive 1 | Silmer ACR Di-1508 | Polydimethylsiloxane difunctional acrylate copolymer | Siltech LLC |
| Additive 2 | BYK-SILCLEAN 3710 | Polyether modified acryl functional polydimethylsiloxane | BYK-Chemie |
| Additive 3 | BYK-UV 3530 | Polyether modified polydimethylsiloxane | BYK-Chemie |

TABLE 3-continued

| Component | Trademark | Description | Source |
|---|---|---|---|
| Additive 4 | CoatOSil 7602 | Polyalkyleneoxide modified polydimethylsiloxane | Momentive Performance Materials, Inc. |
| Additive 5 | Palmitic Acid | Palmitic Acid, 98% | Sigma-Aldrich |

Examples of coating compositions, where concentration of components are given in wt. % and the results of physical testing for each coating composition are listed in Table 4 and Table 5.

The results of physical testing for each coating composition are listed in Tables 4 and 5. Coating examples that resulted in loss of adhesion after the 2-hour water boil test, failure of the sunscreen exposure test or thermoforming tests are indicated as comparative. The Tabor abrasion is measured under ASTM D1044-08 method using CS10F wheel with 500 grams weight and measuring the haze in the samples before and after 100 of the abrasion cycles, and listing the initial haze and the change in haze (delta haze %). Adhesion test follows the ASTM D3002-07 standard methodology. The rating for this test for coating adhesion is visual, starting with 5B (Pass) for the best adhesion down to 0B (Fail) for the lowest rating for adhesion. The thermoforming test was performed using a cell phone tool that had a maximum depth of approximately 0.5 inches. The coated surface was the outside surface in tension. The tool temperatures were set at 260° F. (126.7° C.), and the coated sample films were heated to 350° F.-400° F. (176.7° C.-204.4° C.) for the thermoforming process. The thermoformed parts were then visually examined for cracks. For the thermoforming test, the results are reported as pass and fail, wherein cracks in the coatings are considered a failure.

The amount of monomer was kept constant at 31.1% (except for Coatings 1 and 2) to ensure appropriate comparison of different oligomers. The application temperature of coatings was varied slightly to achieve similar application viscosity (about 100 cps) and coating thickness (approximately 5-10 micrometers) for the cured films. The application of coating was achieved using a hand feed laminator by Innovative Machine Corporation (Birmingham, Ala.). Bisphenol A polycarbonate film was used as a substrate for coating application. The film had a thickness of 10 mils (250 micrometers). The coating was sandwiched between the film and the casting stainless steel plate and cured through the film to avoid presence of oxygen (air). Fusion F300S12™ Ultraviolet Curing System (Fusion UV Systems, Inc.) using Fusion "H" bulb was used to cure the coatings. The conveyor speed (MC-12 conveyor by R&D Equipment, Norwalk, Ohio) was kept constant at 20 feet per minute to achieve the same UV-dose of approximately 1.0 J/cm².

TABLE 4

| | Coating 1 | Coating 2 | Coating 3 | Coating 4 | Coating 5 | Coating 6 | Coating 7 |
|---|---|---|---|---|---|---|---|
| Monomer 1 | 35.0 | 33.1 | 31.1 | 31.1 | 31.1 | 31.1 | 31.1 |
| Oligomer 1 | 62.7 | 64.8 | 66.9 | 46.9 | 46.9 | 46.9 | 46.9 |
| Oligomer 2 | 0 | 0 | 0 | 20 | 0 | 0 | 0 |
| Oligomer 3 | 0 | 0 | 0 | 0 | 20 | 0 | 0 |
| Oligomer 4 | 0 | 0 | 0 | 0 | 0 | 20 | 0 |
| Oligomer 5 | 0 | 0 | 0 | 0 | 0 | 0 | 20 |
| Photoinitiator 1 | 0.9 | 0.9 | 0.8 | 0.8 | 0.8 | 0.8 | 0.8 |
| Photoinitiator 2 | 0.9 | 0.9 | 0.8 | 0.8 | 0.8 | 0.8 | 0.8 |
| Additive 1 | 0.5 | 0.4 | 0.4 | 0.4 | 0.4 | 0.4 | 0.4 |
| Total wt. % | 100 | 100 | 100 | 100 | 100 | 100 | 100 |
| Initial haze, % | 1.6 | 1.0 | 1.4 | 1.4 | 1.1 | 1.2 | 1.0 |
| Delta haze after Taber test, % | 6.1 | 4.2 | 5.2 | 1.9 | 4.5 | 6.5 | 3.8 |
| Initial adhesion test | Pass | Pass | Pass | Pass | Pass | Pass | Pass |
| Adhesion test after 2 hr water boil | Pass | Pass | Pass | Pass | Pass | Pass | Pass |
| Sunscreen exposure test - 1 hr | Pass | Pass | Pass | Pass | Pass | Pass | Pass |
| Sunscreen exposure test - 24 hr | Fail | Pass | Fail | Fail | Fail | Fail | Pass |
| Thermoforming test | Fail | Fail | Fail | Fail | Fail | Fail | Pass |

TABLE 5

| | Coating 8 | Coating 9 | Coating 10 | Coating 11 | Coating 12 | Coating 13 |
|---|---|---|---|---|---|---|
| Monomer 1 | 31.1 | 31.1 | 31.1 | 31.1 | 31.1 | 31.1 |
| Oligomer 1 | 46.9 | 46.9 | 46.9 | 46.9 | 46.9 | 46.9 |
| Oligomer 6 | 20 | 0 | 0 | 0 | 0 | 0 |
| Oligomer 7 | 0 | 20 | 0 | 0 | 0 | 0 |
| Oligomer 8 | 0 | 0 | 20 | 0 | 0 | 0 |
| Oligomer 9 | 0 | 0 | 0 | 20 | 0 | 0 |
| Oligomer 10 | 0 | 0 | 0 | 0 | 20 | 0 |
| Oligomer 11 | 0 | 0 | 0 | 0 | 0 | 20 |
| Photoinitiator 1 | 0.8 | 0.8 | 0.8 | 0.8 | 0.8 | 0.8 |
| Photoinitiator 2 | 0.8 | 0.8 | 0.8 | 0.8 | 0.8 | 0.8 |
| Additive 1 | 0.4 | 0.4 | 0.4 | 0.4 | 0.4 | 0.4 |
| Total wt. % | 100 | 100 | 100 | 100 | 100 | 100 |

TABLE 5-continued

| | Coating 8 | Coating 9 | Coating 10 | Coating 11 | Coating 12 | Coating 13 |
|---|---|---|---|---|---|---|
| Initial haze, % | 1.2 | 1.1 | 1.2 | 1.1 | 1.3 | 1.3 |
| Delta haze after Taber test, % | 5.2 | 3.8 | 2.8 | 2.6 | 3.8 | 7.1 |
| Initial adhesion test | Pass | Pass | Pass | Pass | Pass | Pass |
| Adhesion test after 2 hr water boil | Pass | Pass | Pass | Fail | Pass | Pass |
| Sunscreen exposure test - 1 hr | Pass | Pass | Pass | Pass | Pass | Pass |
| Sunscreen exposure test - 24 hr | Fail | Fail | Fail | Fail | Pass | Fail |
| Thermoforming test | Fail | Fail | Fail | Fail | Pass | Fail |

Coating 7 containing a coating composition comprising a combination of Oligomer 1 (Photomer 6892™) and Oligomer 5 (CN131B™), based on the results in Table 4, demonstrated desirable result in terms of flexibility, Taber abrasion, and adhesion. As illustrated in Table 4, Coating 7 passed the thermoforming test without cracking, had a Delta haze after the Taber abrasion test of less than 5%, and had no adhesion failures after the water boil and passed the sunscreen exposure testing. Coating 12 containing a coating composition comprising a combination of Oligomer 1 (Photomer 6892™) and Oligomer 10 (Photomer 6210™), based on the results in Table 4, demonstrated desirable result in terms of flexibility, Taber abrasion, and adhesion. As illustrated in Table 4, Coating 12 passed the thermoforming test without cracking, had a Delta haze after the Taber abrasion test of less than 5%, and had no adhesion failures after the water boil and passed the sunscreen exposure testing. Coating 7 and 12 demonstrate that coating that comprises of an urethane acrylate oligomer with functionality of 2 to 3, a tensile strength of 1,300 psi to 1,400 psi, elongation of 40% to 47%, a glass transition temperature of 14° C. to 32° C. and viscosities of 12,000 cps to 33,000 cps at 25° C. can provide desired properties for the coating composition.

The coatings from Tables 4, 5, and 6 that showed desirable results were additionally tested to determine how easy the coatings would release from the casting plate or roll after UV-curing. It was found that Additive 1 did not provide adequate release properties by leaving residual coating spots on the casting plate. Several other release additives were tested and the results are listed in Table 7.

TABLE 6

| Component Number | Coating 14 | Coating 15 | Coating 16 | Coating 17 | Coating 18 | Coating 19 | Coating 20 | Coating 21 | Coating 22 |
|---|---|---|---|---|---|---|---|---|---|
| Monomer 1 | 31.1 | 31.1 | 31.1 | 31.1 | 31.1 | 31.1 | 31.1 | 31.1 | 31.1 |
| Oligomer 1 | 46.9 | 46.9 | 46.9 | 46.9 | 46.9 | 46.9 | 46.9 | 46.9 | 46.9 |
| Oligomer 12 | 20 | 0 | 0 | 0 | 0 | 0 | 0 | 0 | 0 |
| Oligomer 13 | 0 | 20 | 0 | 0 | 0 | 0 | 0 | 0 | 0 |
| Oligomer 14 | 0 | 0 | 20 | 0 | 0 | 0 | 0 | 0 | 0 |
| Oligomer 15 | 0 | 0 | 0 | 20 | 0 | 0 | 0 | 0 | 0 |
| Oligomer 16 | 0 | 0 | 0 | 0 | 20 | 0 | 0 | 0 | 0 |
| Oligomer 17 | 0 | 0 | 0 | 0 | 0 | 20 | 0 | 0 | 0 |
| Oligomer 18 | 0 | 0 | 0 | 0 | 0 | 0 | 20 | 0 | 0 |
| Oligomer 19 | 0 | 0 | 0 | 0 | 0 | 0 | 0 | 20 | 0 |
| Oligomer 20 | 0 | 0 | 0 | 0 | 0 | 0 | 0 | 0 | 20 |
| Photoinitiator 1 | 0.8 | 0.8 | 0.8 | 0.8 | 0.8 | 0.8 | 0.8 | 0.8 | 0.8 |
| Photoinitiator 2 | 0.8 | 0.8 | 0.8 | 0.8 | 0.8 | 0.8 | 0.8 | 0.8 | 0.8 |
| Additive 1 | 0.4 | 0.4 | 0.4 | 0.4 | 0.4 | 0.4 | 0.4 | 0.4 | 0.4 |
| Total wt % | 100 | 100 | 100 | 100 | 100 | 100 | 100 | 100 | 100 |
| Initial haze, % | 1.1 | 1.2 | 1.0 | 1.3 | 1.4 | 1.3 | 1.3 | 1.1 | 1.1 |
| Delta haze after Taber test, % | 4.4 | 3.6 | 2.8 | 6.3 | 2.5 | 4.4 | 3.5 | 2.8 | 6.7 |
| Initial adhesion test | Pass | Pass | Pass | Pass | Pass | Pass | Pass | Pass | Pass |
| Adhesion test after 2 hr water boil | Pass | Pass | Fail | Fail | Pass | Pass | Pass | Pass | Pass |
| Sunscreen exposure test - 1 hr | Pass | Pass | Pass | Pass | Pass | Pass | Pass | Pass | Pass |
| Sunscreen exposure test - 24 hr | Fail | Fail | Fail | Fail | Fail | Fail | Fail | Fail | Fail |
| Thermoforming test | Fail | Fail | Fail | Fail | Fail | Fail | Fail | Fail | Fail |

TABLE 7

| Component Number | Coating 23 | Coating 24 | Coating 25 |
|---|---|---|---|
| Monomer 1 | 31.1 | 31.1 | 31.1 |
| Oligomer 1 | 47.2 | 47.2 | 47.2 |
| Oligomer 5 | 20 | 20 | 20 |
| Photoinitiator 1 | 0.5 | 0.5 | 0.5 |
| Photoinitiator 2 | 0.8 | 0.8 | 0.8 |
| Additive 2 | 0.4 | | |
| Additive 3 | | 0.4 | |
| Additive 4 | | | 0.27 |
| Additive 5 | | | 0.13 |
| Total wt % | 100.0 | 100.0 | 100.0 |
| Initial haze, % | 0.5 | 0.4 | 0.3 |

TABLE 7-continued

| Component Number | Coating 23 | Coating 24 | Coating 25 |
|---|---|---|---|
| Delta haze after Taber test, % | 3.9 | 5.0 | 3.6 |
| Initial adhesion test | Pass | Pass | Pass |
| Adhesion test after 2 hr water boil | Pass | Pass | Pass |
| Sunscreen exposure test - 1 hr | Pass | Pass | Pass |
| Sunscreen exposure test - 24 hr | Pass | Pass | Pass |
| Thermoforming test | Pass | Pass | Pass |
| Coating release from the casting plate or roll | Good | Good | Excellent |

Coating 25 comprising a combination of Monomer 1 (Photomer 4017™), Oligomer 1 (Photomer 6892™), Oligomer 5 (CN131B™), Photoinitiator 1 (Additol HDMAPT™), Photoinitiator 2 (Irgacure 819™), Additive 4 (CoatOSil 7602™) and Additive 5 (Palmitic Acid), based on the results in Table 7, demonstrated desirable result in terms of coating release properties and also meets other tests requirements including transparency (initial haze less than 1% (obtained less than or equal to 0.5%), Taber abrasion (delta haze less than or equal to 5%), thermoforming test without cracking, no adhesion failure after the water boil and passed the sunscreen exposure testing.

In an embodiment, a coated thermoplastic film comprises: a polycarbonate film substrate; and a coating formed from a coating composition that comprises a urethane acrylate having a functionality of 2.0 to 3.0 acrylate functional groups, wherein the urethane acrylate has an elongation percent at break of at least 10 according to ASTM D882-10; an acrylate monomer having at least two acrylate functional groups; and an epoxy acrylate oligomer having an acrylate functional group; wherein the urethane acrylate is present in the amount of 30 to 70 wt. % of the coating composition, the acrylate monomer is present in the amount of 20 to 40 wt. % of the coating composition and the epoxy acrylate oligomer is present in the amount of 10 to 30 wt. % of the coating composition, a photoinitiator is present in the amount of 0.1 to 10 wt. % of the coating composition, and a silicone additive is present in the amount of 0.1 to 3 wt. %; wherein the coating composition has been cured; and wherein the polycarbonate film substrate is a co-extruded multilayer film substrate comprising a first layer, on which the coating is applied, comprising a blend of a first polycarbonate that comprises repeat units of dimethyl bisphenol cyclohexane monomer and a second polycarbonate that comprises repeat units of bisphenol A; and a second layer, adjacent to the first layer, comprising a polycarbonate that comprises repeat units of bisphenol A, without a polycarbonate that comprises repeat units of dimethyl bisphenol cyclohexane monomer.

Set forth below are some embodiments of the coated thermoplastic film, molded article and methods for making the same.

Embodiment 1

A coated thermoplastic film, comprising: a polymeric film substrate; and a coating formed from a coating composition comprising a urethane acrylate having a functionality of 2.0 to 6.0 acrylate functional groups; an acrylate monomer having a functional group; and an epoxy acrylate oligomer.

Embodiment 2

The coated thermoplastic film of Embodiment 1, further comprising an additive comprising at least one of a silicone based additive, palmitic acid, and combinations comprising at least one of the foregoing.

Embodiment 3

The coated thermoplastic film of any of Embodiments 1-2, wherein the wherein the coating composition comprises about 30 wt. % to about 70 wt. % urethane acrylate, about 20 wt. % to about 40 wt. % acrylate monomer, about 10 wt. % to about 40 wt. % of the epoxy acrylate oligomer, and about 0.1 wt. % to about 5 wt. % of the additive.

Embodiment 4

The coated thermoplastic film of any of Embodiments 1-3, wherein additive comprises polydimethysiloxane acrylate copolymer, polyether polydimethysiloxane, polyalkyleneoxide modified polydimethylsiloxane copolymer, palmitic acid, or a combination comprising at least one of the foregoing.

Embodiment 5

The coated thermoplastic film of any of Embodiments 1-4, wherein the additive comprises palmitic acid and polyalkyleneoxide modified polydimethylsiloxane copolymer.

Embodiment 6

The coated thermoplastic film of any of Embodiments 1-5, wherein the additive comprises about 0.1 wt. % to about 1.0 wt. % palmitic acid and about 0.1 wt. % to about 1.0 wt. % polyalkyleneoxide modified polydimethylsiloxane copolymer.

Embodiment 7

The coated thermoplastic film of any of Embodiments 1-6, wherein the polymeric film substrate comprises polycarbonate.

Embodiment 8

The coated thermoplastic film of any of Embodiments 1-7, wherein the epoxy acrylate oligomer has a functionality of 1 to 6 functional groups.

Embodiment 9

The coated thermoplastic film of any of Embodiments 1-8, wherein the epoxy acrylate oligomer has a viscosity of less than or equal to 500 centipoise at 25° C.

Embodiment 10

The coated thermoplastic film of any of Embodiments 1-9, wherein the epoxy acrylate oligomer has a tensile strength of greater than or equal to 5 MegaPascals.

Embodiment 11

The coated thermoplastic film of any of Embodiments 1-10, wherein the epoxy acrylate oligomer has a tensile strength of greater than or equal to 6 MegaPascals.

Embodiment 12

The coated thermoplastic film of any of Embodiments 1-11, wherein the epoxy acrylate oligomer has a tensile strength of less than or equal to 10 MegaPascals.

Embodiment 13

The coated thermoplastic film of any of Embodiments 1-12, wherein the epoxy acrylate oligomer has a glass transition temperature of less than or equal to 25° C.

Embodiment 14

The coated thermoplastic film of any of Embodiments 1-13, wherein the epoxy acrylate oligomer has an elongation percent at break of greater than or equal to 35%.

Embodiment 15

The coated thermoplastic film of any of Embodiments 1-14, wherein the coating composition comprises greater than zero to 25 wt. % of the epoxy acrylate oligomer.

Embodiment 16

The coated thermoplastic film of any of Embodiments 1-15, wherein the coating composition comprises greater than zero to less than or equal to 20 wt. % of the epoxy acrylate oligomer.

Embodiment 17

The coated thermoplastic film of any of Embodiments 1-16, wherein the polycarbonate film substrate comprises a co-extruded multilayer film comprising a first layer comprising a blend of polycarbonate comprising repeat units of dimethyl bisphenol cyclohexane monomer and a polycarbonate comprising repeat units of bisphenol A; and a second layer comprising a polycarbonate comprising repeat units of bisphenol A without polycarbonate comprising repeat units of dimethyl bisphenol cyclohexane monomer.

Embodiment 18

The coated thermoplastic film of any of Embodiments 1-17, wherein the urethane acrylate oligomer has, on average, 2 to 5.5 acrylate functional groups.

Embodiment 19

The coated thermoplastic film of any of Embodiments 1-18, wherein the urethane acrylate oligomer has, on average, 2 to 3.5 acrylate functional groups.

Embodiment 20

The coated thermoplastic film of any of Embodiments 1-19, wherein the urethane acrylate oligomer has, on average, 2 to 3 acrylate functional groups.

Embodiment 21

The coated thermoplastic film of any of Embodiments 1-20, wherein the urethane acrylate oligomer has a viscosity of less than or equal to 50,000 centipoise at 25° C.

Embodiment 22

A molded article, comprising: the coated thermoplastic film of any of Embodiments 1-21, and a printed decorative film bonded to an injection molded polymeric base structure; wherein the coated thermoplastic film has been formed into a non-planar three-dimensional shape matching a three-dimensional shape of the injection molded polymeric base structure.

Embodiment 23

A method of molding an article, comprising:
decorating and forming the coated thermoplastic film of any of Embodiments 1-21 to form a shaped film; and placing the shaped film into a mold, and injecting a resin into the mold cavity space behind the shaped film, wherein the shaped film and the injection molded resin form a single molded part.

Embodiment 24

The method of Embodiment 23, further comprising
printing a surface of the coated thermoplastic film opposite the coating with markings to obtain a decorative film; forming and trimming the decorative film into a non-planar three-dimensional shape; fitting the decorative film into the mold having a surface that matches the non-planar three-dimensional shape of the decorative film; and injecting a resin comprising a polycarbonate resin into the mold cavity behind the decorative film to produce a one-piece, bonded non-planar three-dimensional product.

Embodiment 25

The method of any of Embodiments 23-24, wherein the shaping the coated thermoplastic film comprises thermoforming.

Embodiment 26

The method of any of Embodiments 23-25, further comprising curing the shaped film.

Embodiment 27

The method of any of Embodiments 23-26, further comprising curing the product.

As used herein, the term "(meth)acrylate" and "acrylate" encompasses both acrylate and methacrylate groups, including in reference to both the urethane acrylate and the acrylate monomer. All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" and "the" herein do not denote a limitation of quantity, and are to be construed to cover both the singular and the plural, unless otherwise indicated herein or clearly contradicted by context. "Optional" or "optionally" means that the subsequently described event or circumstance can or cannot occur, and that the description includes instances where the event occurs and instances where it does not. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A coated thermoplastic film, comprising:
    a polymeric film substrate; and
    a coating formed from a coating composition comprising
        a urethane acrylate having a functionality of 2.0 to 6.0 acrylate functional groups;
        an acrylate monomer having a functional group;
        an epoxy acrylate oligomer; and
    an additive comprising at least one of a silicone based additive, palmitic acid, and combinations comprising at least one of the foregoing;
    wherein the epoxy acrylate oligomer has one or more of an elongation percent at break of greater than or equal to 35%; a viscosity of less than or equal to 500 centipoise at 25° C.; a tensile strength of greater than or equal to 5 MegaPascals; a functionality of 1 to 6 functional groups; and a glass transition temperature of less than or equal to 25° C.

2. The coated thermoplastic film of claim 1, wherein the coating composition comprises about 30 wt. % to about 70 wt. % urethane acrylate, about 20 wt. % to about 40 wt. % acrylate monomer, about 10 wt. % to about 40 wt. % of the epoxy acrylate oligomer, and about 0.1 wt. % to about 5 wt. % of the additive.

3. The coated thermoplastic film of claim 1, wherein the additive comprises polydimethysiloxane acrylate copolymer, polyether polydimethysiloxane, polyalkyleneoxide modified polydimethylsiloxane copolymer, palmitic acid, or a combination comprising at least one of the foregoing.

4. The coated thermoplastic film of claim 1, wherein the additive comprises palmitic acid and polyalkyleneoxide modified polydimethylsiloxane copolymer.

5. The coated thermoplastic film of claim 1, wherein the additive comprises about 0.1 wt. % to about 1.0 wt. % palmitic acid and about 0.1 wt. % to about 1.0 wt. % polyalkyleneoxide modified polydimethylsiloxane copolymer.

6. The coated thermoplastic film of claim 1, wherein the polymeric film substrate comprises polycarbonate.

7. The coated thermoplastic film of claim 6, wherein the polycarbonate film substrate comprises a co-extruded multilayer film comprising
    a first layer comprising a blend of polycarbonate comprising repeat units of dimethyl bisphenol cyclohexane monomer and a polycarbonate comprising repeat units of bisphenol A; and
    a second layer comprising a polycarbonate comprising repeat units of bisphenol A without polycarbonate comprising repeat units of dimethyl bisphenol cyclohexane monomer.

8. The coated thermoplastic film of claim 1, wherein the silicone based additive is present in an amount of 0.3 to 2.5 wt. %.

9. The coated thermoplastic film of claim 1, wherein the silicone based additive is present in an amount of 0.4 to 1 wt. %.

10. The coated thermoplastic film of claim 1, wherein the silicone based additive is present in an amount of 0.1 to 3 wt. %.

11. A molded article, comprising:
    the coated thermoplastic film of claim 1, and
    a printed decorative film bonded to an injection molded polymeric base structure;
    wherein the coated thermoplastic film has been formed into a non-planar three-dimensional shape matching a three-dimensional shape of the injection molded polymeric base structure.

12. A method of molding an article, comprising:
    decorating and forming a coated thermoplastic film to form a shaped film,
    wherein the coated thermoplastic film comprises a polymeric film substrate and a coating formed from a coating composition; and
    wherein the coating composition comprises a urethane acrylate having a functionality of 2.0 to 6.0 acrylate functional groups, an acrylate monomer having a functional group, an epoxy acrylate oligomer having an acrylate functional group; and an additive comprising at least one of a silicone based additive, palmitic acid, and combinations comprising at least one of the foregoing; wherein the epoxy acrylate oligomer has one or more of an elongation percent at break of greater than or equal to 35%; a viscosity of less than or equal to 500 centipoise at 25° C.; a tensile strength of greater than or equal to 5 MegaPascals; a functionality of 1 to 6 functional groups; and a glass transition temperature of less than or equal to 25° C.; and
    placing the shaped film into a mold, and injecting a resin into the mold cavity space behind the shaped film, wherein the shaped film and the injection molded resin form a single molded part.

13. The method of claim 12, further comprising
    printing a surface of the coated thermoplastic film opposite the coating with markings to obtain a decorative film;

forming and trimming the decorative film into a non-planar three-dimensional shape;

fitting the decorative film into the mold having a surface that matches the non-planar three-dimensional shape of the decorative film; and injecting a resin comprising a polycarbonate resin into the mold cavity behind the decorative film to produce a one-piece, bonded non-planar three-dimensional product.

14. The method of any of claim 12, wherein the shaping the coated thermoplastic film comprises thermoforming.

15. The method of any of claim 12, further comprising curing the shaped film.

16. The method of any of claim 12, further comprising curing the product.

* * * * *